(12) United States Patent
Asghari Kamrani et al.

(10) Patent No.: US 11,063,895 B2
(45) Date of Patent: Jul. 13, 2021

(54) MUSIC/VIDEO MESSAGING SYSTEM AND METHOD

(71) Applicants: Nader Asghari Kamrani, Centreville, VA (US); Kamran Asghari Kamrani, Centreville, VA (US)

(72) Inventors: Nader Asghari Kamrani, Centreville, VA (US); Kamran Asghari Kamrani, Centreville, VA (US)

( * ) Notice: Subject to any disclaimer, the term of this patent is extended or adjusted under 35 U.S.C. 154(b) by 81 days.

(21) Appl. No.: 15/808,154

(22) Filed: Nov. 9, 2017

(65) Prior Publication Data

US 2018/0069820 A1    Mar. 8, 2018

Related U.S. Application Data

(63) Continuation of application No. 12/453,847, filed on May 26, 2009, now abandoned.
(Continued)

(51) Int. Cl.
*G06Q 10/10* (2012.01)
*H04L 12/58* (2006.01)

(52) U.S. Cl.
CPC .............. *H04L 51/24* (2013.01); *G06Q 10/10* (2013.01)

(58) Field of Classification Search
CPC .... G06F 16/954; G06F 17/241; G06F 3/0481; G06F 15/16; G06F 11/1451; G06F 11/1464; G06F 11/1469; G06F 16/182; G06F 16/184; G06F 16/435; G06F 16/4387; G06F 16/44; G06F 16/637; G06F 16/639; G06F 16/64; G06F 16/68; G06F 16/686; G06F 16/90; G06F 16/9535; G06F 16/9558; G06F 16/958; G06F 17/248; G06F 17/289; G06F 21/10; G06F 21/31; G06F 21/36; G06F 21/552; G06F 21/60; G06F 21/604; G06F 21/6236; G06F 21/6272; G06F 2201/80; G06F 2221/2117; G06F 3/0482; G06F 3/04842; G06F 3/1204; G06F 3/1222; G06F 3/1238; G06F 3/1271; G06F 3/1288; G06F 9/453
See application file for complete search history.

(56) References Cited

U.S. PATENT DOCUMENTS 6,035,339 A    3/2000  Agraharam et al.
6,693,652 B1   2/2004  Barrus et al.
(Continued)

OTHER PUBLICATIONS

PTO Final Office Action dated Nov. 2, 2018, U.S. Appl. No. 12/656,252, pp. 1-80.
(Continued)

*Primary Examiner* — Di Xiao
(74) *Attorney, Agent, or Firm* — Farber LLC (57) ABSTRACT

A system and method for creating custom music/video messages to facilitate and/or improve social interaction. The music/video messages may include at least portions of: music, video, pictures, slideshows, and/or text. Custom music/video messages may be created by a user in communication with a music/video provider and a music/video messaging system. The music/video messaging system and/or a distribution network send the music/video messages to one or more intended recipient(s). The custom music/video messages are representative of feelings or emotions to be communicated by the user to the one or more recipient(s).

31 Claims, 5 Drawing Sheets

Related U.S. Application Data (60) Provisional application No. 61/055,940, filed on May 23, 2008.

(56) References Cited

U.S. PATENT DOCUMENTS

| | | | |
|---|---|---|---|
| 6,769,028 | B1 | 7/2004 | Sass et al. |
| 7,082,469 | B2 | 7/2006 | Gold et al. |
| 7,551,935 | B2 | 6/2009 | Karmakar |
| 7,702,542 | B2 | 4/2010 | Aslanian, Jr. |
| 7,778,925 | B2 | 8/2010 | Siegel et al. |
| 7,865,137 | B2 | 1/2011 | Goldberg et al. |
| 8,079,066 | B1* | 12/2011 | Cordell ............... G06F 21/41 726/5 |
| 8,166,418 | B2 | 4/2012 | Williams |
| 8,260,263 | B2 | 9/2012 | Wan et al. |
| 8,448,227 | B2 | 5/2013 | Eyal |
| 8,463,927 | B2 | 6/2013 | Liang |
| 9,396,195 | B1* | 7/2016 | Beguelin ............ H04N 21/4826 |
| 2002/0087427 | A1 | 7/2002 | Ganesan et al. |
| 2002/0087549 | A1 | 7/2002 | Mostafa |
| 2002/0129693 | A1 | 9/2002 | Wilks |
| 2003/0060240 | A1 | 3/2003 | Graham |
| 2003/0110297 | A1 | 6/2003 | Tabatabai et al. |
| 2003/0120805 | A1 | 6/2003 | Couts et al. |
| 2003/0191816 | A1 | 10/2003 | Landress et al. |
| 2004/0215696 | A1 | 10/2004 | Fisher |
| 2004/0254859 | A1* | 12/2004 | Aslanian, Jr. ........ G06Q 10/107 705/14.73 |
| 2005/0169443 | A1 | 8/2005 | Rosenthal |
| 2005/0197846 | A1 | 9/2005 | Pezaris et al. |
| 2006/0036681 | A1 | 2/2006 | Friedman et al. |
| 2006/0075033 | A1* | 4/2006 | Bienstock ............ G06Q 10/107 709/206 |
| 2006/0080613 | A1 | 4/2006 | Savant |
| 2006/0098027 | A1 | 5/2006 | Rice et al. |
| 2006/0112169 | A1 | 5/2006 | Bodlaender |
| 2007/0005795 | A1 | 1/2007 | Gonzalez |
| 2007/0038577 | A1 | 2/2007 | Werner et al. |
| 2007/0046823 | A1 | 3/2007 | Jiang |
| 2007/0088793 | A1 | 4/2007 | Landsman |
| 2007/0115991 | A1 | 5/2007 | Ramani |
| 2007/0124376 | A1 | 5/2007 | Greenwell |
| 2007/0129006 | A1 | 6/2007 | Goldberg et al. |
| 2007/0133764 | A1 | 6/2007 | Goldberg |
| 2007/0136769 | A1 | 6/2007 | Goldberg et al. |
| 2007/0155312 | A1 | 7/2007 | Goldberg et al. |
| 2007/0157071 | A1 | 7/2007 | Daniell |
| 2007/0198925 | A1 | 8/2007 | He et al. |
| 2007/0209005 | A1* | 9/2007 | Shaver ................. G06F 16/958 715/733 |
| 2007/0220054 | A1 | 9/2007 | Hunter et al. |
| 2007/0233736 | A1 | 10/2007 | Xiong et al. |
| 2007/0254684 | A1 | 11/2007 | Jiang |
| 2007/0255785 | A1 | 11/2007 | Hayashi |
| 2007/0264975 | A1 | 11/2007 | Bae et al. |
| 2007/0264982 | A1 | 11/2007 | Nguyen et al. |
| 2007/0275740 | A1 | 11/2007 | Deutsch et al. |
| 2007/0276864 | A1 | 11/2007 | Espelien |
| 2008/0005282 | A1 | 1/2008 | Gaedcke |
| 2008/0070605 | A1 | 3/2008 | Kim |
| 2008/0071875 | A1 | 3/2008 | Koff et al. |
| 2008/0086431 | A1* | 4/2008 | Robinson ................ A63F 13/12 706/11 |
| 2008/0104679 | A1 | 5/2008 | Craig |
| 2008/0127289 | A1 | 5/2008 | Julia |
| 2008/0147810 | A1 | 6/2008 | Kumar et al. |
| 2008/0147812 | A1 | 6/2008 | Curtis |
| 2008/0152097 | A1 | 6/2008 | Kent |
| 2008/0189331 | A1 | 8/2008 | Lee et al. |
| 2008/0189366 | A1 | 8/2008 | Cox et al. |
| 2008/0256602 | A1 | 10/2008 | Pagan |
| 2008/0275966 | A1* | 11/2008 | MacKinnon ............ H04L 67/26 709/219 |
| 2008/0307320 | A1 | 12/2008 | Payne et al. |
| 2009/0012059 | A1 | 1/2009 | Feng et al. |
| 2009/0013048 | A1 | 1/2009 | Partaker et al. |
| 2009/0013265 | A1 | 1/2009 | Cole et al. |
| 2009/0048922 | A1 | 2/2009 | Morgenstern et al. |
| 2009/0061825 | A1 | 3/2009 | Neelakantan et al. |
| 2009/0082045 | A1 | 3/2009 | Mitchell et al. |
| 2009/0083541 | A1 | 3/2009 | Levine |
| 2009/0113315 | A1 | 4/2009 | Fisher et al. |
| 2009/0132075 | A1 | 5/2009 | Barry |
| 2009/0144392 | A1 | 6/2009 | Wang et al. |
| 2009/0156170 | A1 | 6/2009 | Rossano et al. |
| 2009/0177744 | A1 | 9/2009 | Marlow et al. |
| 2009/0234846 | A1 | 9/2009 | Schigel et al. |
| 2009/0259821 | A1 | 10/2009 | Yasrebi et al. |
| 2009/0271712 | A1 | 10/2009 | Ligh |
| 2010/0159883 | A1 | 6/2010 | Pascal et al. |
| 2010/0205179 | A1 | 8/2010 | Carson et al. |
| 2010/0223314 | A1 | 9/2010 | Gadel et al. |
| 2010/0246789 | A1 | 9/2010 | Vance |
| 2011/0145343 | A1 | 6/2011 | Golobrodsky |

OTHER PUBLICATIONS

PTO Final Office Action dated Oct. 19, 2017, U.S. Appl. No. 12/656,252, pp. 1-64.
PTO Non-Final Office Action dated Mar. 17, 2017, U.S. Appl. No. 12/656,252, pp. 1-75.
PTO Final Office Action dated Feb. 24, 2016, U.S. Appl. No. 12/656,252, pp. 1-20.
PTO Non-Final Office Action dated May 18, 2015, U.S. Appl. No. 12/656,252, pp. 1-17.
PTO Final Office Action dated Sep. 4, 2014, U.S. Appl. No. 12/656,252, pp. 1-21.
PTO Non-Final Office Action dated Feb. 26, 2014, U.S. Appl. No. 12/656,252, pp. 1-12.
PTO Final Office Action dated Aug. 17, 2012, U.S. Appl. No. 12/656,252, pp. 1-21.
PTO Final Office Action dated Mar. 2, 2012, U.S. Appl. No. 12/656,252, pp. 1-28.
"Socialstream Features", Oct. 5, 2007, Retrieved from the Internet on Mar. 31, 2018: http://www.hcii.cs.edu:80/M-HCI/2006/SocialstreamProject/features.php, pp. 1-3.
Mark Hendrickson, "Fuser: Manage All Your Email and Social Networking Messages in One Place", Sep. 25, 2007, Retrieved from the Internet on Mar. 31, 2018: http://techcrunch.com/2007/09/25/fuser-manage-all-your-email-and-social-networking-messages-in-one-place, pp. 1-7.
"Facebook Messaging just got better...", Aug. 20, 2007, Retrieved from the Internet on Mar. 31, 2018: http://www.facebook.com/notes/facebook/facebook-messaging-just-go-better/5344177130/, p. 1.
PTO Non-Final Office Action dated Apr. 5, 2018, U.S. Appl. No. 12/656,252, pp. 1-80.
PTO Non-Final Office Action dated Apr. 4, 2019, U.S. Appl. No. 12/656,252, pp. 1-29.
PTO Final Office Action dated Apr. 12, 2021, U.S. Appl. No. 16/560,833, pp. 1-31.

* cited by examiner

MUSIC/VIDEO MESSAGING SYSTEM AND METHOD

This application is a continuation of U.S. patent application Ser. No. 12/453,847 filed May 26, 2009, which claims priority to U.S. provisional patent application 61/055,940 filed May 23, 2008, the contents of which are hereby incorporated by reference herein in their entireties.

BACKGROUND OF THE INVENTION

Field of the Invention

The present disclosure relates generally to digital communication, and more particularly to creating and/or sending music/video messages.

Today as digital communication becomes more commonplace, debates remain as to whether such communication helps, or hinders, inter-personal relationships. On one hand, communication using written words such as email and instant messaging (IM) remove meaning, or context, (e.g., facial expressions, gestures, etc.) surrounding the individual(s) communicating. Text messaging, which is becoming a more popular form of social interaction, relies heavily on the use of abbreviated words and acronyms— abridging communications even more. As a result, it is more difficult to ascertain or interpret true feelings or emotions behind such messages. On the other hand, it is recognized that digital communication helps to reduce boundaries that exist in the physical world attributed to e.g., geographic distance, social "circles," and more.

Every music has a message to say something. The message is for instance about love, friendship, family, peace, compassion, and how people can stay together with tolerance. But currently, music is primarily used as a form of entertainment, through personal devices such as CD players, iPods, laptops or digital players. However, it has not yet been fully appreciated that music and the message of music may also be used as a form of communication to trigger memories or to express feelings or emotions. Moreover, as the market of multimedia wireless devices, mobile phones and computers spreads and new wireless network technologies are being improved, it is now possible to improve relationships and social networks using music and/or video as a way of communication.

SUMMARY OF THE INVENTION

The present invention discloses music/video messaging systems and methods for connecting people on a social scale through the use of personal computers, laptops, pocket PCs, mobile phones, iPods, the Internet, wireless networks, and more.

The disclosed systems and methods address certain aforementioned limitations by allowing users to create custom music/video messages that can be created, edited, etc. to improve and/or facilitate social interaction. For example, instead of sending music as the message, a user or client can create and send a music/video message that in effect uses music, video, text, etc. as "metadata" for a unique, custom message. In this way, a user is able to utilize multimedia as a tool to electronically convey his true emotions and/or feelings, trigger memories of shared experiences, convey a message based on common interests, and more in a personalized manner. In embodiments, recipient(s) may choose to download the message, edit the message, and/or forward the message to other friend(s) or recipient(s). Each time the message is edited, forwarded, etc., new user-related information is added to the message.

The disclosed systems and methods also address certain aforementioned limitations by involving music/video providers in the communication process. Preferably, the music/video providers offer content for users to customize and/or send as a message to others. By offering such content, the music/video providers are presented with additional sources of revenue, and are encouraged to produce or obtain quality products.

According to one aspect, a method for creating a custom music/video message representative of feelings or emotions to be communicated to one or more recipient device(s) over a communications network is disclosed. The method comprising: presenting user-customizable content selections to a user device display; receiving user-customized content selection(s) from the user device; receiving user-provided customized content, if any, from the user device; receiving recipient device information from the user device; notifying the recipient device(s) of the user-customized content; and in response to a request from a recipient device, providing the user-customized content to the recipient device in a single music/video message. Preferably, the music/video message comprises a combination of at least two of: music, video, pictures, slideshows, and text.

Preferably the user/client communication device and recipient device(s) include, but are not limited to: personal computers, laptops, personal digital assistants, pocket PCs, iPods, and/or mobile phones. In embodiments, the selected content corresponds to at least portions of music, video, pictures, slideshows, and/or text/voice message. Additional information may include, but is not limited to: sender's name, phone number, e-mail address, IP address, date/time, recipient(s) name, phone number, e-mail address, IP-address, etc. In further embodiments, creating the custom music/video message includes combining the music, video, pictures, slideshows and/or text/voice message into a single message. In some cases, the user may provide their own content to be combined with selected content. For example, a husband may wish to send a custom music/video message to his wife and provide the custom text "I still love you" to be combined with their wedding song.

According to another aspect, a system for creating a custom music/video message representative of feelings or emotions to be communicated to one or more recipient device(s) over a communications network is disclosed. The system comprising: at least one server configured to: present user-customizable content selections to a user device display; receive user-customized content selection(s) from the user device; receive user-provided content, if any, from the user device; receive recipient device information from the user device; notify the recipient device(s) of the user-customized content; and in response to a request from a recipient device, provide the user-customized content to the recipient device in a single music/video message. Preferably, the music/video message comprises a combination of at least two of: music, video, pictures, slideshows, and text.

Preferably the user communication device and recipient device(s) include, but are not limited to: personal computers, laptops, personal digital assistants, pocket PCs, iPods, and/or mobile phones. In embodiments, the selected content corresponds to at least portions of music, video, pictures, slideshows, and/or text/voice message. In further embodiments, the music/video message system combines the selected music, video, pictures, slideshows and/or text/voice message into a single message. In some cases, user-provided content is combined with selected content. For example, a user may combine the music theme from "Rocky" with the personal text "I know you can do it!" to send to a friend preparing for a job interview and thereby trigger inspirational feelings or emotions.

One advantage of the music/video messages system disclosed herein is that it helps to improve existing relationships as well as to create new social links. Music/video messaging brings happiness and fun to new as well as existing relationships. The receiver of music/video message will get more value out of the message than from text alone. For example, playing a music/video message that has message of love will provide different experience to the receiver of the message than a text message alone. Also playing music/video message can trigger memories and emotions e.g., of shared experiences. For example, playing a wedding song can trigger romantic or sentimental feelings, playing a clip or sound-bite of a favorite movie can trigger happy or inspirational emotions, etc. As a result, friends and families could use music/video messages to communicate their feelings and emotions in new and creative ways that is not possible to do without it.

The present invention offers a solution to problems associated with attempting to remotely communicate feelings or emotions using only written words.

Unlike systems and methods currently in use, the present systems and methods allow a user to create a custom music/video message that more closely reflects their true feelings or emotions instead of being limited to "pre-canned" messages.

One advantage that the present systems and methods can provide is personalized music/video messages. As a result, music/video messages tailored to specific situations, interests, etc. may be shared between users.

Other advantages of music/video messages as disclosed herein are that:

Such music/video messages effectively enable users to communicate their true feelings, ideas, etc. while enabling message recipients to experience positive feelings and emotions.

The music/video messages allow users to communicate the message of music in remote and/or mobile situations.

The disclosed music/video message systems and methods create a fun and social environment.

The disclosed music/video message systems and methods help to strengthen existing relationships.

The music/video message systems and methods disclosed herein also help to create new social links.

The disclosed music/video message systems and methods help to motivate music stakeholders to produce high quality products with positive messages.

DETAILED DESCRIPTION OF THE INVENTION AND PREFERRED EMBODIMENTS

Reference will now be made in detail to various exemplary embodiments of the invention, examples of which are illustrated in the accompanying drawings. The following detailed description describes certain embodiments of the invention, and should not be considered as limiting the invention to those embodiments.

As used herein, "a" means at least one or more. In embodiments, a music/video message may be a mixture of at least portions of music, video, pictures, slideshows, and/or text/voice message. In some embodiments, a user may provide their own music, video, pictures, slideshows and/or text/voice message to be included in the music/video message. In embodiments, users may choose music, video, pictures, slideshows, and/or text from available lists, charts, icons, displays, etc. to send to other recipient(s) as a music/video message. To attribute original sources, in some cases the music/video providers may include original author/source information with the content, issue disclaimers along with the content, incorporate special watermarks, etc.

Figure 1A:
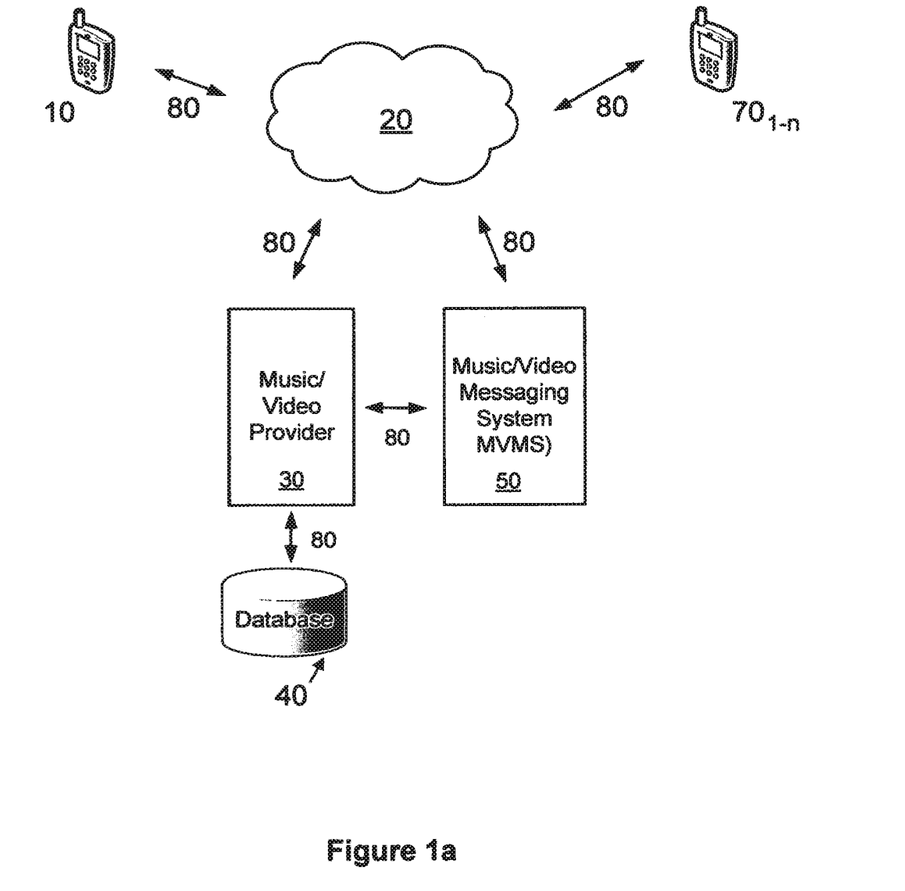
FIG. 1a is a block diagram illustrating a system for creating and/or sending music/video messages according to an exemplary embodiment.
Figure 1B:
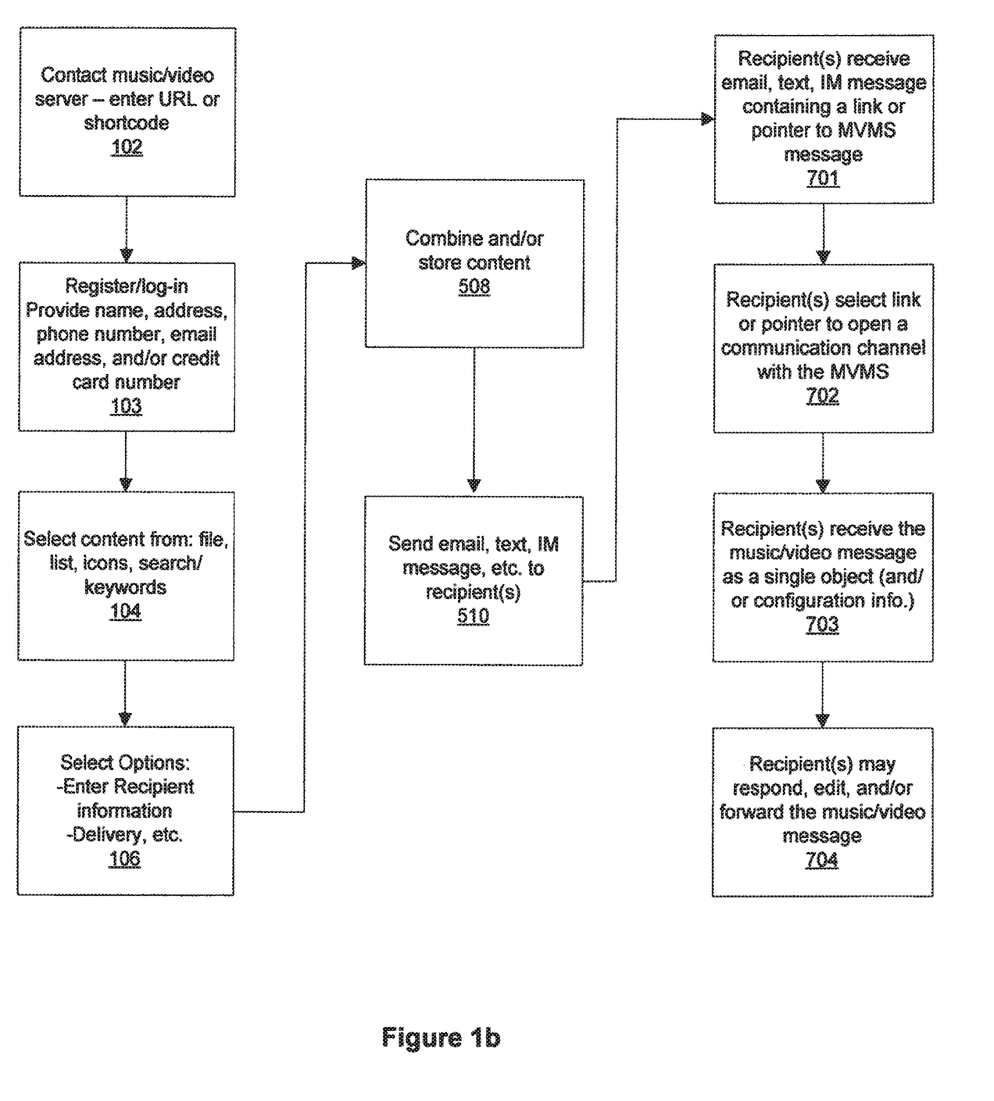
FIG. 1b is a flowchart illustrating a method steps for creating and/or sending music/video messages according to an exemplary embodiment.

Turning now to the figures, which depict various exemplary embodiments of the invention, FIG. 1a shows a system for creating and sending music/video messages and FIG. 1b shows method steps according to an exemplary embodiment. It will be appreciated that the method steps may be performed using any combination of hardware and/or software as will be appreciated by those skilled in the art and that the method steps need not necessarily be performed in the particular order disclosed. As shown in FIGS. 1a and b, one or more user device 10 communicates with a music/video provider 30 and/or a music/video messaging system (MVMS) 50 via a communication network 20 and one or more communication links 80. See step 102. In the embodiment shown in FIG. 1a, the music/video provider 30 and music/video messaging system (MVMS) 50 are shown as separate entities. However, it is appreciated that in other embodiments, the functions of the music/video provider 30 and MVMS 50 may be combined. In further embodiments, the music/video provider 30 and the MVMS 50 may be executed on the same, or multiple, collocated or distributed servers. The user device 10 includes, but is not limited to: a personal computer, laptop, personal digital assistant, pocket PC, iPod, and/or mobile phone. Preferably, the user device 10 further includes: a central processor, RAM/ROM, data storage (including internal and external storage), a display, keyboard, speaker, microphone, data interface(s), receiver/transmitter, battery, and the like. Examples of internal and external storage devices include: SD cards, micro SD cards, multimedia cards, SIM cards, compact flash, secure digital, memory sticks, or the like. The user device 10 also includes a proprietary or open source Operating System including, but not limited to, any Windows or MAC platform, UNIX/Linux, RIM OS, PALM OS, Symbian OS, etc. In addition, the user device 10 includes a graphical user interface and preferably web browsing capabilities. In embodiments, the user device 10 also preferably includes a media player. Examples of suitable media players include, but are not limited to, SMIL players such as Adobe™ Media Player, QuickTime™ Player, RealPlayer™, Helix Player, Totem Player, or other equivalent proprietary or open source software. In some embodiments, the user device 10 only needs a browser, and instructions/software for executing the music/video message may be provided by the MVMS 50 and/or video provider 30 in the form of a plug-in, API, download, etc. In other embodiments, the user device 10 browser contains built-in media player functionality. Communication network 20 includes any combination of: LANs, WANs, MANs, the Internet, Intranets, private networks, wired and/or wireless (e.g., IEEE 802.11 standard, satellite, cellular, GSM/GPRS, CDMA, TDMA) networks, mobile networks, public switched telephone networks (PSTN), SMS, SMSC, MMS, SMTP/MIME and/or IM distribution networks, aggregators, provisioning and hosting providers, mobile operators, service providers, gateways, etc.

In embodiments, the music/video provider 30 comprises one or more associated servers and/or databases. Accordingly, the user device 10 may contact a music/video provider 30 by entering a website, URL, or shortcode associated with the music/video provider 30. The user device 10 may communicate with the music/video provider 30, MVMS 50, and/or recipient device 70 using any combination of HTTP, FTP, SMTP, RTP, WAP, SMS, MMS, IM protocols, or the like. In embodiments, the user registers and/or creates an account at the music/video provider website (step 103) and downloads any software necessary to configure the user device for creating/sending music/video messages. For example, an account may include: name, address, phone number, email, and/or credit card information. In addition, custom messages created by the user may be stored with the user account e.g., to send again or edit at a later time. Created messages may be stored in memory associated with the user device 10 and/or on one of the servers/databases associated with the music/video provider 30 and/or MVMS 50. Preferably, the music/video provider website 30 allows the user of device 10 to select content that is representative of feelings or emotions the user would like to communicate to one or more recipient(s). For example, the user may be presented with a list of selectable content such as music, videos, slideshows, pictures, text, etc. Additionally, or alternatively, the user may be presented with indicia such as icons, thumbnails, or other images representative of various forms of content. It is further possible that the user may provide his own content (e.g., music, videos, slideshows, pictures, text, etc.) to be included in the music/video message. In this case, the music/video provider 30 and/or MVMS 50 may receive user-provided content (e.g., uploaded, emailed, texted, or the like by the user device 10). The user then may select the music/video content to be communicated to a recipient that represents his/her feeling(s) and/or emotions via a user interface of the user device 10. See step 104. Additionally, the user may register with the music/video provider 30 site to receive a new and/or random music/video every day/week/month or on a specific day. For example, the music/video provider 30 may be configured to make music/video suggestions based on previous user choices. In another example, the music/video provider 30 may be configured to notify the user of new available content.

It is appreciated that the music/video provider 30 may be a single provider or alternatively may correspond to multiple providers. For example, the music/video provider 30 may include one provider that interfaces with users and has business relationships with, and is in communication with, other music/video providers 30. In some embodiments, the MVMS 50 is the one provider that has business relationships with other music/video providers 30. Moreover, one music/video provider 30 may offer music only, another provider video only, and so forth. Alternatively, one or more music/video providers 30 may offer a various types of content such as: music and video; music, video and pictures, etc. According to various business models, the music/video provider(s) 30 may provide content to the user and/or recipient(s) for free, or for a fee.

In embodiments, the music/video provider 30 displays available content to the user on a website via a series of lists, charts, icons, displays, etc. According to various design considerations, such content may be grouped by title, artist, theme, subject, keywords, or the like. Music content, for example, may include pre-recorded music, music recorded by the user, sound clips, synthesized music, music mixes, or the like. Such content may be stored (permanently or temporarily) on the music/video provider's 30 and/or MVMS 50 server(s). Additionally, content may be stored on one or more databases 40 in communication with the music/video provider 30 and/or MVMS 50. In embodiments, the MVMS 50 may act as a portal to multiple different music/video providers 30. In this case, the user need only contact the MVMS website to select diverse types of content from various sources.

In addition, a user may search content via the music/video provider 30 and/or MVMS 50 website by entering search terms, keywords, etc. In addition, search capabilities may allow a user to speak the search terms, selections, etc. using voice recognition software (e.g., if using a mobile phone).

Once content has been selected, the user provides recipient information to the music/video provider website for delivering a music/video message (step 106). Such recipient information includes at least one of: email address, phone number, music/video provider site account information (where the recipient has an account with the same or different music/video provider, or other service providers such as Facebook, MySpace, Plaxo, etc.), account information, or the like. In some cases, the music/video provider 30 is configured to provide "Send" Options to enable user to schedule music/video messages to be sent at specific times and dates (e.g. birthday, anniversary, etc.).

The music/video provider 30 is further in communication with the music/video messaging system 50. The music/video provider 30 provides the content selected by the user as well as recipient information to the music/video messaging system 50. In embodiments, the music/video messaging system 50 is operated by the same music provider or a third party provider that handles streaming and/or loading of the music/video message to the recipient device(s) $70_{1-n}$. Accordingly, the music/video messaging system 50 and music/video provider's system 30 may be combined in a single application or the music/video messaging system 50 may be implemented as separate module/application that resides on the same, or different, server(s) than the music/video provider 30. Also, the music/video messaging system 50 may be implemented as part of the music/provider's system 30 that resides on the same, or different, server(s) than the music/video provider 30.

The music/video messaging system 50 is configured to combine and/or store the selected content (e.g., music, video, slideshows, and/or text/voice message). Step 508. Selected content may be combined using a variety of commercial or custom "mixing" software and/or instructions. In embodiments, the MVMS 50 is configured to combine the selected content (e.g., music, video, pictures, and/or text) in a single container. In embodiments, the MVMS is configured to combine the selected content (e.g., music, video, pictures, and/or text) by referencing and/or embedding the content in the music/video message. Selected content may include, but is not limited to, the following types of file formats: MP3, WAV, RealAudio, Ogg, Vorbis, Sorenson, AIFF, AAC, MIDI, MPEG, JPEG, MIDI, 3GPP, AVI, BMP, GIF, TIFF, PNG, MOV, RealVideo, MJPEG, TXT, etc. In embodiments, distribution network 20 determines whether the recipient device(s) 70 are capable of receiving the music/video message and/or performs any necessary transformations or adaptations for sending the music/video message to the recipient device(s) as will be appreciated by those skilled in the art.

In the embodiment of FIGS. 1 and *b*, the music/video messaging system 50 is configured to inform the recipient device(s) 70$_{1-n}$ that the message is available. This may be done, for example, by sending an email or text (e.g., SMTP, SMS, MMS, IM, etc.) message to the recipient device(s) 70$_{1-n}$ including instructions for accessing the music/video message. (Step 510). In some cases, the instructions include e.g., a URL link, phone number, and/or code for accessing/downloading the message and its contents. Step 701. Upon selecting the link, the recipient device 70 communicates with the MVMS 50 to receive the music/video message as a single object. See steps 702 and 703.

Additionally or alternatively, the music/video provider 30 and/or MVMS 50 are configured to provide the recipient(s) with the option to forward the message to another compatible device 70$_n$. Preferably, the recipient(s) are provided with an option to respond to the music/video message in an interactive manner (704). For example, a recipient may choose to add his own text comment or picture and reply to the user and/or forward to other recipient device(s) 70$_n$. In embodiments, the music/video messaging system 50 and/or MVMS 30 is configured to manage changes to the music/video message made by other recipients and/or to use log data to keep an audit trail so that the sender of each message may be determined.

Figure 2:
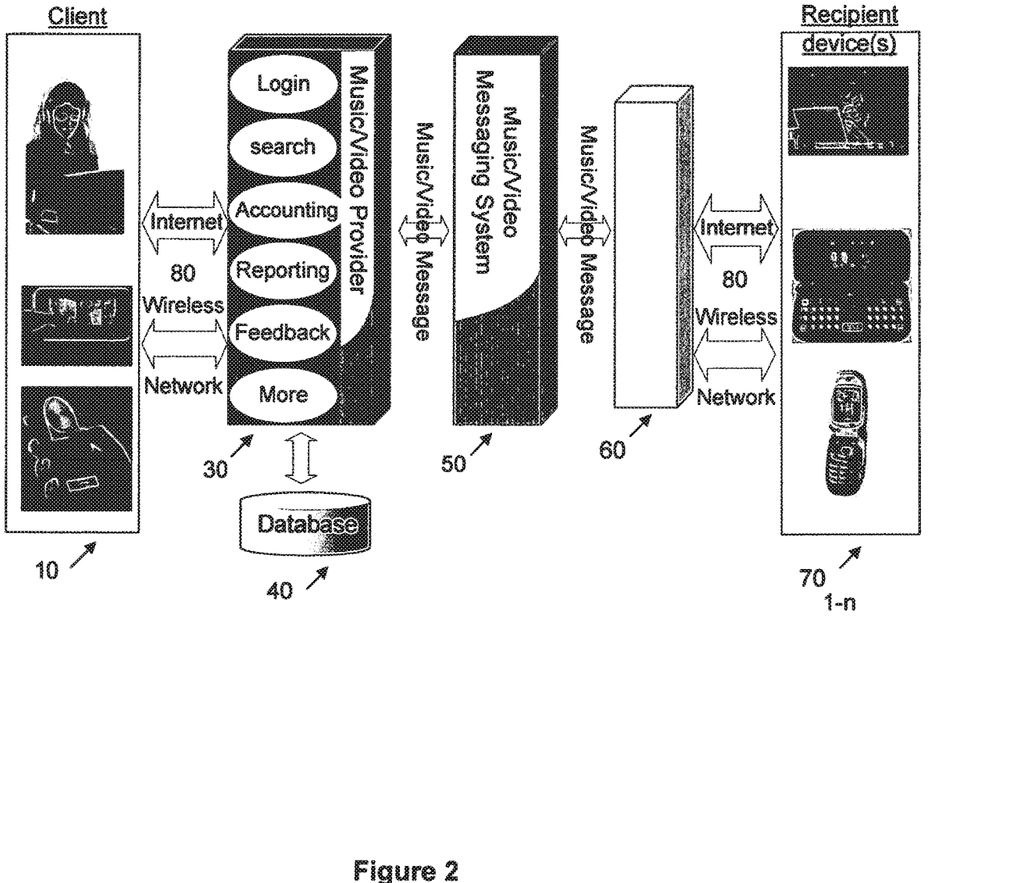
FIG. 2 is a block diagram illustrating a system for creating and/or sending music/video messages according to yet another exemplary embodiment.

FIG. 2 depicts a system for creating and sending music/video messages according to another exemplary embodiment. As shown in FIG. 2, a user communicates with the music/video provider 30 e.g., by accessing the music/video provider's 30 website. In embodiments, the website includes: login, search, accounting, reporting, feedback options and more. It is appreciated that the music/video provider 30 may be comprised of one or more different content providers and associated content servers. Additionally or alternatively, the music/video provider 30 may include one provider that interfaces with users and has business relationships with other music/video providers 30. Moreover, according to various business models, the music/video provider 30 may provide content for free, or for a fee. Furthermore, the music/video provider may generate additional revenue from advertisers, etc.

In embodiments, the music/video provider 30 displays available content to the user via a series of lists, charts, icons, displays, etc. According to various design considerations, such content may be grouped by title, artist, theme, subject, keywords, or the like. Preferably, the music/video provider website allows the user to select content that is representative of feelings or emotions the user would like to communicate to one or more recipient(s). In addition, the user provides recipient information to the music/video provider website for delivering the music/video message. Such recipient information includes at least one of: email address, phone number, music/video provider site account information (where the recipient has an account with the same or different music/video provider, or other service providers such as Facebook, MySpace, etc.), account information, or the like. Additionally, the user may register with the music/video provider site to receive a new and/or random music/video periodically every day/week/month or on a specific day. The user then may choose the music/video to be communicated to a recipient that best represents his/her feeling(s).

Additionally or alternatively, the user is provided with an option to search content on the music/video provider website by entering search terms, keywords, etc. In embodiments, such search capabilities allow a user to type the search terms or speak the search terms (e.g., if using a mobile phone). Additionally, the music/video provider may provide "Send" Options to let user to schedule music/video messages to be sent at specific times or dates (e.g. birthday, anniversary, etc).

The music/video provider 30 is further in communication with a music video messaging system 50. Preferably, the music/video provider 30 provides the content selected by the user as well as recipient information to the music/video messaging system 50. In embodiments, the music/video messaging system 50 comprises one or more servers configured to combine the selected content (e.g., music, video, pictures, slideshows, and/or text/voice message) to form a single music/video message. In embodiments, the server(s) are configured to store the selected content into a single container and/or to embed the selected content in a file along with other information regarding the music/video message. For example, the MVMS 50 server may be configured to combine content by embedding the following information in a single file or container associated with a music/video message:

<img src="img.bmp" region=/>
<audio src="sound.mp3"/>
<text src="message.txt." region=/>

In further embodiments, information regarding the music/video message (e.g., sender information, message ID, time/date, recipient information, etc.) is stored in one or more database(s) 40 maintained by the MVMS 50 and/or music/video provider 30. In the embodiment of FIG. 2, the music/video message is sent to a distribution network 60. The distribution network 60, in turn, is responsible for notifying one or more of the recipient device(s) 70$_{1-n}$ of the music/video message, adapting and/or delivering the message.

For example, the distribution network 60 informs the recipient device(s) 70$_{1-n}$ that the music/video message is available. This may be done, for example, by sending an email or text message to the recipient device(s) 70$_{1-n}$ including instructions for accessing the music/video message. In some cases, the instructions include e.g., a URL link and/or code for accessing/downloading the message and its contents. Preferably, the recipient device(s) 70$_{1-n}$ include, but are not limited to: mobile phones, iPods, laptops, PCs, pocket PCs, and PDAs.

The distribution network 60 includes one or more distribution chain players including, but not limited to: Aggregators, Gateways, Provisioning and Hosting Providers, Mobile Operators, SMS Centers, streaming delivery providers and/or other Service Providers. In this case, the distribution network 60 is responsible for ensuring that the recipient device(s) 70$_{1-n}$ are capable of receiving the music/video message and/or performing any necessary transformations, content adaptations, etc. as will be appreciated by those skilled in the art.

Figure 3:
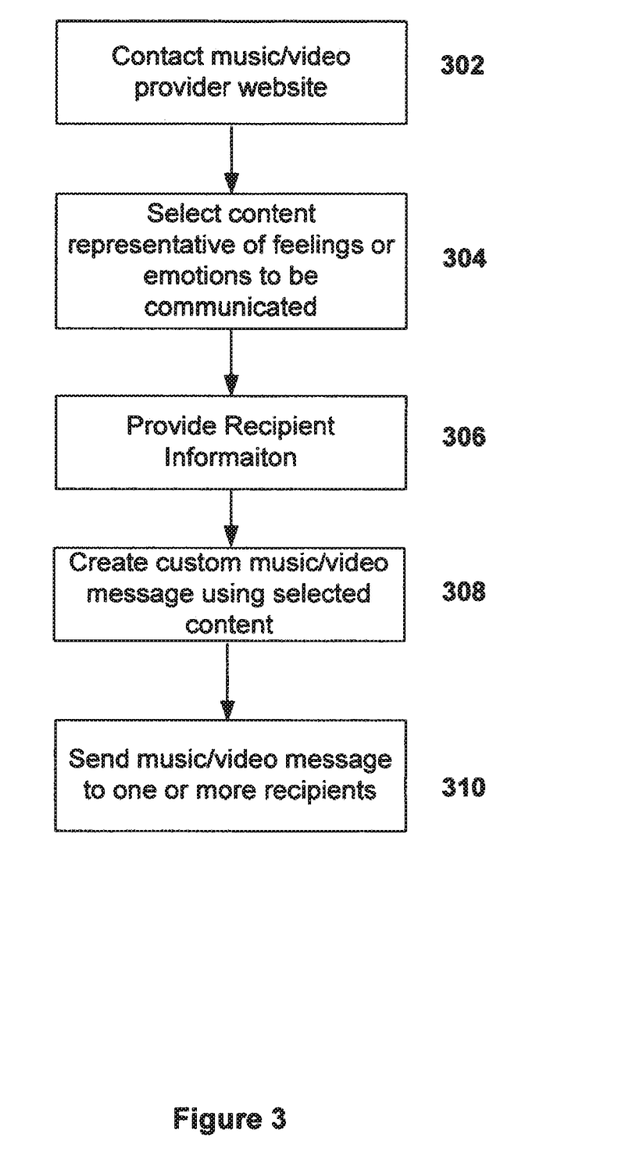
FIG. 3 illustrates method steps for sending and receiving music/video messages according to another exemplary embodiment.

FIG. 3 illustrates a flowchart of method steps according to an exemplary embodiment. It is understood that the method steps may be performed using any combination of hardware and/or software as will be appreciated by those skilled in the art and that the method steps need not necessarily be performed in the particular order disclosed.

In step 302, the user communicates with the music/video provider 30. Preferably, the online music/video provider 30 has an application, website or portal that allows the user to interface with the provider. The user is then able to select content that they would like to send in the form of a music/video message. At step 316, the user provides recipient information necessary for contacting one or more recipient(s). Such recipient information may be e.g., phone number, email addresses, music/video provider site account information (where the recipient has an account with the same or different music/video provider, or other service providers such as Facebook, Myspace, etc.), account, or the like. Once the recipient information is received, the music/video provider send the information and selected content to the music/video messaging system 50 and/or distribution network 60 at step 308. In turn, the music/video messaging system 50 and/or distribution network 60 informs the recipient device(s) $70_{1-n}$ that the music/video message is available 310. Such informing may include, for example, sending a text, voice, or email message to the recipient's device $70_{1-n}$. The recipient may choose to receive the music/video message by going through instructions provided by the music/video messaging system 50 and/or distribution network 60. In embodiments, the recipient device $70_{1-n}$ retrieves the music/video message by selecting a URL link contained in a text message such as SMS or email. The recipient device $70_{1-n}$ may download the music/video message or may receive the music/video message as streaming music/video. Any action taken by the recipient in order to retrieve the music/video message authorizes the music/video messaging system 50, music/video provider 30, and/or distribution network 60 to send the music/video message to the recipient.

It is understood that the above method steps performed by the music/video provider(s) 30, database(s) 40, and/or music/video messaging system 50 may be implemented in the form of hardware and/or software instructions as will be appreciated by those skilled in the art. Software instructions may include custom macros, sub-routines, logic, or the like implemented using commercially available software such as MS SQL Server™, Visual Basic, C++, SMIL, XML, HTML, XHTML, Java, JavaScript, C #, APIs, etc. According to a further aspect, the software instructions for performing the disclosed method steps may reside in whole, or in part, on a computer-readable medium. Examples of computer readable media include, but are not limited to: hard drives, memory chips, memory sticks, memory cards, CDs, DVDs, tapes, and the like.

Figure 4:
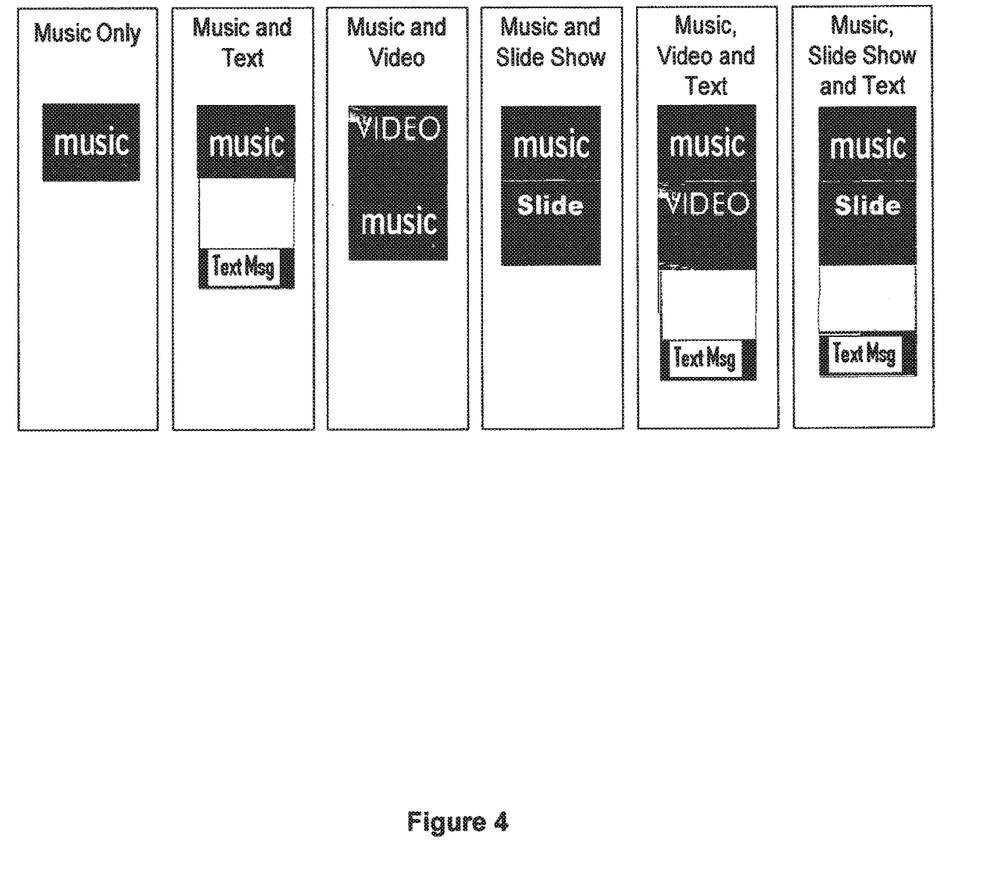
FIG. 4 depicts various combinations of music video/messages.

FIG. 4 depicts different types of content combined in a music/video message. As shown, various combinations may include, but are not limited to: music only; music and text/voice; music and video; music and slide show; music, video and text/voice; music, slide show and text/voice, etc.

According to another non-limiting example, members of social networking sites (such as Facebook, MySpace, Plaxo, etc.) may send music/video messages to their network of friends. When a social networking user receives a music/video message from another member, the user may keep the message or part of the message private or public. The user may allow others to see information such as number of music/video messages that the user has or who the sender is. The user may also allow other members to listen and/or watch the user's music/video messages.

The music/video provider 30 may use technologies such as Web, HTTP, WAP, SMS, MMS, IM and/or email to provide music/video messaging service to users. In embodiments, a user may send a message (SMS text message, email, etc.) to the music/video provider 30 with a communication device 10 such as mobile phone and request a music/video message to be sent to a recipient device 70. In other embodiments, the music/video provider's service may be voice-activated. In the examples below it is assumed that "123456" is music/video provider's SMS short code.

Example 1 a user wants to include Madonna's "crazy for you" music/video into a music/video message and send it to a recipient phone number which is in our example 703-470-3040. The user brings up a mobile phone's text messaging screen and enters the text message "7034703040 Madonna (Crazy for you)". This text message is sent to the music/video provider's short code (which, in this example is 123456). As soon as music/video service provider 30 receives the text message, the music/video provider 30 creates the music/video message and sends it to the recipient contact information which, in this example, is recipient's phone number 703-470-3040.

Example 2 a user wants to include Madonna's "crazy for you" music/video into a music/video message that also contains text such as "I AM REALLY CRAZY" and send it to a recipient phone number 703-470-3040. The user brings up a mobile phone's text messaging screen and enters the message "7034703040 Madonna (Crazy for you) (I AM REALLY CRAZY)". This text message is sent to music/video provider's short code (which, in this example is 123456). As soon as music/video service provider 30 receives the text message, the music/video provider 30 creates the music/video message and sends it to the recipient contact information which, in this example, is recipient's phone number 703-470-3040.

Example 3 a user's mobile phone number is 310-230-9000 and the user wants to send Madonna's "crazy for you" music/video into a music/video message and send it to a recipient phone number 703-470-3040. The user creates an email and enters the text message "310-230-9000 7034703040 Madonna (Crazy for you)". The user sends this email message to music/video provider's email address. As soon as music/video service provider 30 receives this email message, the music/video provider 30 creates the music/video message and sends it to the recipient contact information which, in this example, is recipient's phone number 703-470-3040. The music/video provider 30 may also to choose to call the user's mobile phone number or send an SMS text message and ask for confirmation before sending the music/video message to the recipient.

Example 4 a user wants to include Madonna's "crazy for you" music/video into a music/video message and send it to a recipient phone number 703-470-3040. The user dials the music/video provider's phone number and leaves a voice message "7034703040 Madonna (Crazy for you)". As soon as music/video service provider 30 receives this voice message, the music/video provider 30 creates the music/video message and sends it to the recipient contact information which, in this example, is recipient's phone number 703-470-3040. The music/video provider 30 may also to choose to call the user's mobile phone number or send an SMS text message and ask for confirmation before sending the music/video message to the recipient.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

The invention claimed is:

1. A method to enhance electronic messaging by enabling a user to select multimedia content from a content provider for delivery to an intended recipient, the method comprising:
    receiving, by a computing system, a selection of one or more multimedia content items from a device of the user;
    creating, by the computing system, a multimedia message using the selection of the one more multimedia content items;
    receiving, by the computing system from the device of the user, a request to deliver the multimedia message to the intended recipient, wherein:
        the request indicates a first service provider of a plurality of service providers for delivery of the multimedia message,
        the plurality of service providers include one or more social media service providers,
        the first service provider is a first social media service provider of the one or more social media service providers, and
        the intended recipient has an account at the first social media service provider; and
    sending electronically the multimedia message only to the intended recipient via the first social media service provider indicated for delivery of the multimedia message for provision to a device of the intended recipient,
    wherein the multimedia message comprises the selection of the one or more multimedia content items or a representation of the selection of the one or more multimedia content items,
    wherein the selection of the one or more multimedia content items is stored at a server accessible by the content provider, and
    wherein the representation of the selection of the one or more multimedia content items is a URL, a link, or a pointer to the one or more multimedia content items stored at the server accessible by the content provider.

2. The method of claim 1, wherein sending comprises delivering the multimedia message such that no user of the first social media service provider other than the intended recipient receives the multimedia message.

3. The method of claim 1, wherein creating the multimedia message comprises combining the selection of the one or more multimedia content items with a user-provided multimedia recording.

4. The method of claim 3, wherein the one or more multimedia content items and the user-provided multimedia recording are at least one of: music, an image, audio, video, and an audiovisual work.

5. The method of claim 1, further comprising combining the selection of the one or more multimedia content items with user-provided multimedia content from the device of the user.

6. The method of claim 1, wherein sending comprises:
    presenting the multimedia message to the intended recipient via the first social media service provider using the device of the intended recipient.

7. The method of claim 1, wherein the multimedia message comprises one or more of: music, image, audio, video, text and an audiovisual work.

8. The method of claim 1, wherein the multimedia message comprises: music content, audio content, video content, image content, audiovisual content, text content, or any combination of: the music content, the audio content, the video content, the image content, the audiovisual content, and the text content.

9. A system for providing a multimedia message for delivery to an intended recipient, the system comprising a processor and a computer-readable memory device storing program instructions that, when executed by the processor control the system to perform operations comprising:
    receiving a selection of one or more multimedia content items from a device of a user;
    creating the multimedia message using the selection of the one more multimedia content items;
    receiving, from the device of the user, a request to deliver the multimedia message to the intended recipient, wherein:
        the request indicates a first service provider of a plurality of service providers for delivery of the multimedia message,
        the plurality of service providers include one or more social media service providers,
        the first service provider is a first social media service provider of the one or more social media service providers, and
        the intended recipient has an account at the first social media service provider,
    sending electronically the multimedia message only to the intended recipient via the first social media service provider indicated for delivery of the multimedia message for provision to a device of the intended recipient,
    wherein the multimedia message comprises the selection of the one or more multimedia content items or a representation of the one or more multimedia content items,
    wherein the selection of the one or more multimedia content items is stored at a server accessible by a content provider, and
    wherein the representation of the selection of the one or more multimedia content items is a URL, a link, or a pointer to the one or more multimedia content items stored at the server accessible by the content provider.

10. The system of claim 9, wherein sending comprises delivering the multimedia message such that no user of the first social media service provider other than the intended recipient receives the multimedia message.

11. The system of claim 9, wherein the system comprises multiple servers corresponding to multiple different multimedia content providers.

12. The system of claim 11, wherein the multiple different multimedia content providers are in communication with at least one common server.

13. The system of claim 9, wherein creating the multimedia message comprises combining the selection of the one or more multimedia content items with user-provided multimedia content from the device of the user.

14. The system of claim 13, wherein the one or more multimedia content items and the user-provided multimedia content are at least one of: music, an image, audio, video, a multimedia recording, and an audiovisual work.

15. The system of claim 9, wherein the operations further comprise combining the selection of the one or more multimedia content items with a user-provided multimedia recording.

16. The system of claim 9, wherein the system is part of the first social media service provider where the multimedia message is sent and received.

17. The system of claim 9, wherein the sending comprises:
presenting the multimedia message to the intended recipient via the first social media service provider using the device of the intended recipient.

18. The system of claim 9, wherein the multimedia message comprises one or more of: music, image, audio, video, text and an audiovisual work.

19. The system of claim 9, wherein the multimedia message comprises: music content, audio content, video content, image content, audiovisual content, text content, or any combination of: the music content, the audio content, the video content, the image content, the audiovisual content, and the text content.

20. A computer implemented method to enhance electronic messaging by enabling a content provider in electronic communication with a user device to receive a request from a user to deliver a multimedia message to an intended recipient via a communication network, the method comprising:
providing, to the user device via the communication network, a plurality of music content selections;
receiving, from the user device via the communication network, one or more music content selections picked by the user from the plurality of music content selections;
receiving user-provided multimedia content;
generating a combination of the one or more music content selections with the user-provided multimedia content;
creating the multimedia message using the combination or a representation of the combination;
receiving, from the user device, the request to deliver the multimedia message to the intended recipient, wherein:
the request indicates a first service provider of a plurality of service providers for delivery of the multimedia message,
the plurality of service providers include one or more social media service providers, and
the first service provider is a first social media service provider of the one or more social media service providers, and
the intended recipient has an account at the first social media service provider; and
electronically sending the multimedia message only to the intended recipient via the first social media service provider indicated for delivery of the multimedia message for provision to a device of the intended recipient,
wherein the multimedia message comprises the combination or the representation of the combination,
wherein the combination is stored at a server accessible by the content provider, and
wherein the representation of the combination is a URL, a link, or a pointer to the combination stored at the server accessible by the content provider.

21. The computer implemented method of claim 20, wherein sending comprises:
delivering the multimedia message to a device of the intended recipient via the first social media service provider; and
presenting the multimedia message to the intended recipient via the first social media service provider using the device of the intended recipient.

22. The computer implemented method of claim 20, wherein the multimedia message comprises portions of one or more of: music, audio, video, and an audiovisual work.

23. The computer implemented method of claim 20, wherein the user-provided multimedia content is at least one of: an image, audio, video, a multimedia recording and an audiovisual work.

24. The computer implemented method of claim 20, wherein the user-provided multimedia content comprises one or more of: music, image, text, audio, video, and an audiovisual work.

25. The computer implemented method of claim 20, wherein the combination comprises one or more of: music, image, text, audio, video, and an audiovisual work.

26. A system that enhances electronic messaging by enabling a content provider in electronic communication with a user device to receive a request for delivery of a multimedia message to an intended recipient via a communication network, the system comprising a processor and a computer-readable memory device storing program instructions that, when executed by the processor, control the system to perform operations comprising:
provide, to the user device via the communication network, a plurality of music content selections;
receive, from the user device via the communication network, one or more music content selections picked by a user from the plurality of music content selections;
receive, from the user device, user-provided multimedia content;
generate a combination of the one or more music content selections with the user-provided multimedia content;
create the multimedia message using the combination or a representation of the combination;
receive, from the user device, a request to deliver the multimedia message to the intended recipient, wherein:
the request indicates a first service provider of a plurality of service providers for delivery of the multimedia message,
the plurality of service providers include one or more social media service providers, and
the first service provider is a first social media service provider of the one or more social media service providers, and
electronically send the multimedia message only to the intended recipient via the first social media service provider indicated for delivery of the multimedia message for provision to a device of the intended recipient,
wherein the multimedia message comprises the combination or the representation of the combination,
wherein the combination is stored at a server accessible by the content provider, and
wherein the representation of the combination is a URL, a link, or a pointer to the combination stored at the server accessible by the content provider.

27. The system of claim 26, wherein sending comprises:
presenting the multimedia message to the intended recipient via the first social media service provider using the device of the intended recipient.

28. The system of claim 26, wherein the multimedia message comprises portions of one or more of: music, audio, video, and an audiovisual work.

29. The system of claim 26, wherein the user-provided multimedia content is at least one of: an image, audio, video, a multimedia recording, and an audiovisual work.

30. The system of claim 26, wherein the user-provided multimedia content comprises one or more of: music, image, text, audio, video, and an audiovisual work.

31. The system of claim 26, wherein the combination comprises one or more of: music, image, text, audio, video, and an audiovisual work.

\* \* \* \* \*